United States Patent
McAlpine et al.

(10) Patent No.: US 6,356,690 B1
(45) Date of Patent: Mar. 12, 2002

(54) SELF-SUPPORTING FIBER OPTIC CABLE

(75) Inventors: Warren W. McAlpine; Michael J. Gimblet; Richard S. Wagman, all of Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/421,817

(22) Filed: Oct. 20, 1999

(51) Int. Cl.[7] .................................................. G02B 6/44
(52) U.S. Cl. ...................... 385/109; 385/100; 385/111; 385/112; 385/113; 385/114
(58) Field of Search ................................. 385/100, 109, 385/111, 112, 113, 114; 174/41

(56) References Cited

U.S. PATENT DOCUMENTS

| | | | |
|---|---|---|---|
| 4,298,322 A | 11/1981 | Anders et al. | 425/147 |
| 4,449,012 A | 5/1984 | Voser | 174/70 A |
| 4,662,712 A * | 5/1987 | Tabata | 385/102 |
| 4,685,875 A | 8/1987 | Chevroulet et al. | 425/136 |
| 4,763,983 A | 8/1988 | Keith | 350/96.23 |
| 4,776,665 A | 10/1988 | Oestreich | 350/96.23 |
| 4,798,443 A | 1/1989 | Knipe et al. | 350/96.23 |
| 4,832,442 A | 5/1989 | Pappas | 350/96.23 |
| 4,838,635 A | 6/1989 | Oestreich | 350/96.23 |
| 4,852,965 A | 8/1989 | Mullin et al. | 350/96.23 |
| 4,883,671 A | 11/1989 | Onodera et al. | 425/122 |
| 5,043,037 A | 8/1991 | Buckland | 156/166 |
| 5,095,176 A * | 3/1992 | Harbrecht | 174/23 R |
| 5,189,718 A | 2/1993 | Barrett et al. | 385/101 |
| 5,230,034 A | 7/1993 | Bottoms, Jr. et al. | 385/113 |
| 5,371,823 A | 12/1994 | Barrett et al. | 385/101 |
| 5,448,670 A * | 9/1995 | Blew | 385/112 |
| 5,577,147 A * | 11/1996 | Arroyo | 385/109 |
| 5,611,016 A * | 3/1997 | Fangmann | 385/100 |
| 5,727,106 A | 3/1998 | Sutehall et al. | 385/100 |

FOREIGN PATENT DOCUMENTS

| | | | |
|---|---|---|---|
| JP | 46-38748 | 11/1971 | H01B/60/005 |
| JP | 61-45515 | of 1984 | G02B/6/44 |
| JP | 61-29811 | 2/1986 | G02B/6/44 |
| JP | 7-113932 | of 1993 | G02B/6/44 |
| JP | 7-248438 | of 1994 | G02B/6/44 |
| JP | 8-211260 | of 1995 | G02B/6/44 |
| JP | 8-136778 | of 1996 | G02B/6/44 |
| JP | 8-75969 | 3/1996 | G02B/6/44 |
| JP | 9-43467 | 2/1997 | G02B/6/44 |
| JP | 9-54232 | 2/1997 | G02B/6/44 |
| JP | 10-302550 | * 11/1998 | |

OTHER PUBLICATIONS

Derwent Abstract; Kokai 6–145515; Mar. 5, 1986.
Derwent Abstract; Kokai 7–113932; May 2, 1995.
Derwent Abstract; Kokai 7–248438; Sep. 26, 1995.
Derwent Abstract; Kokai 8–211260; Aug. 20, 1996.
Derwent Abstract; 9–43467; Feb. 14, 1997.
Derwent Abstract; 6–129811; Feb. 10, 1986.
Abstract of Japan (JP 10302550 A).

* cited by examiner

Primary Examiner—Darren Schuberg
Assistant Examiner—Leo Boutsikaris
(74) Attorney, Agent, or Firm—Timothy J. Aberle

(57) ABSTRACT

A self-supporting fiber optic cable includes messenger and carrier sections and at least one interconnecting web. The messenger section includes at least one support member and a protective jacket. The carrier section includes a tube, at least one optical fiber disposed within the tube, and a jacket. In order to protect the optical fiber from tensile forces and to facilitate mid-span access, the carrier section can have an overlength. In order to accommodate the overlength, the web can include a plurality of intermittent webs that permit the carrier section to bend. The carrier section can also include at least one strength member. The at least one strength member is preferably positioned in a reference plane that also generally extends through the messenger section, the carrier section and the web. By appropriately positioning the strength members relative to the tube, the carrier section preferentially bends in a plane generally orthogonally disposed to the reference plane. As a result, the fiber optic cable not only accommodates the overlength of the carrier section, but also facilitates the winding of the fiber optic cable upon a reel for shipment and storage.

18 Claims, 2 Drawing Sheets

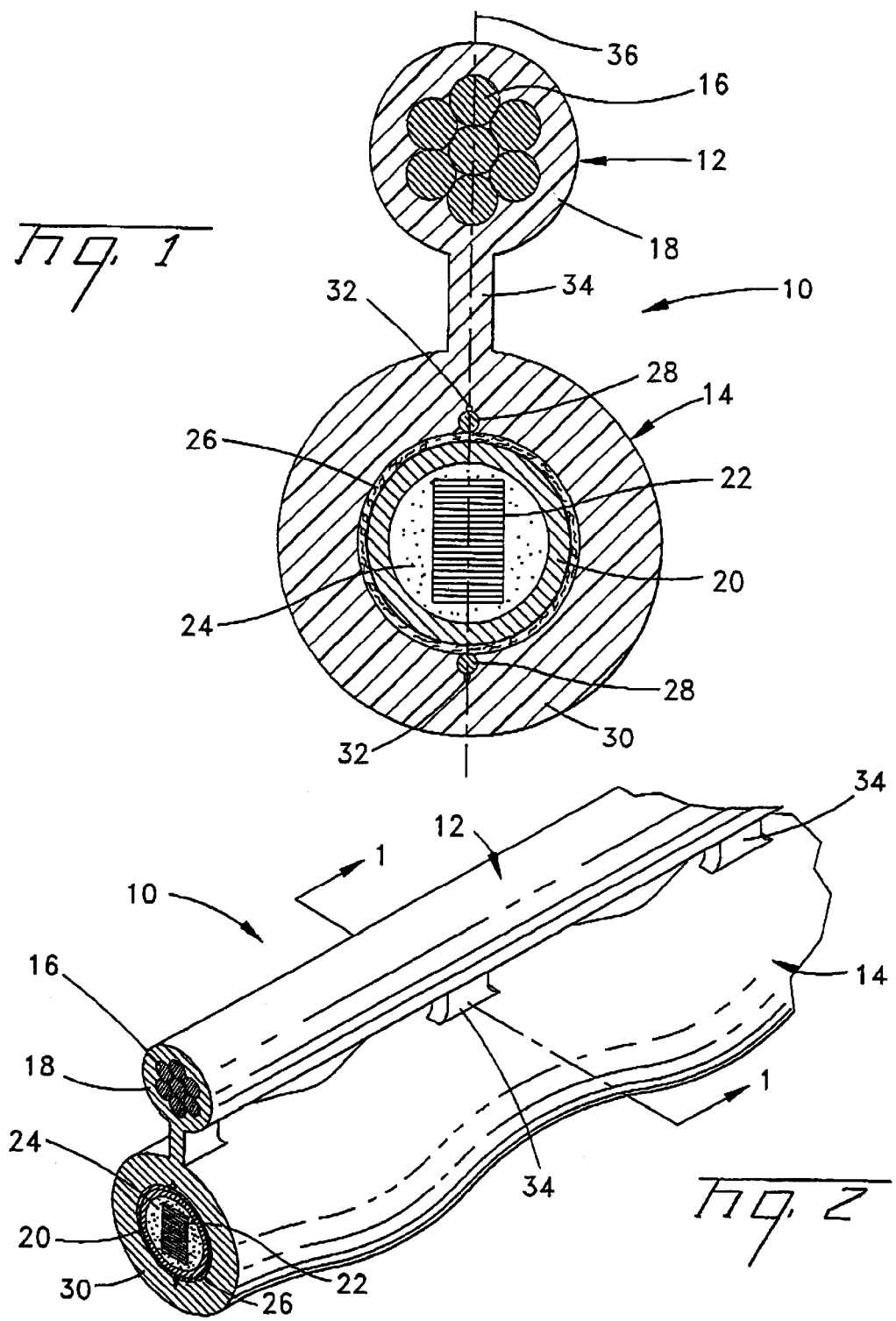

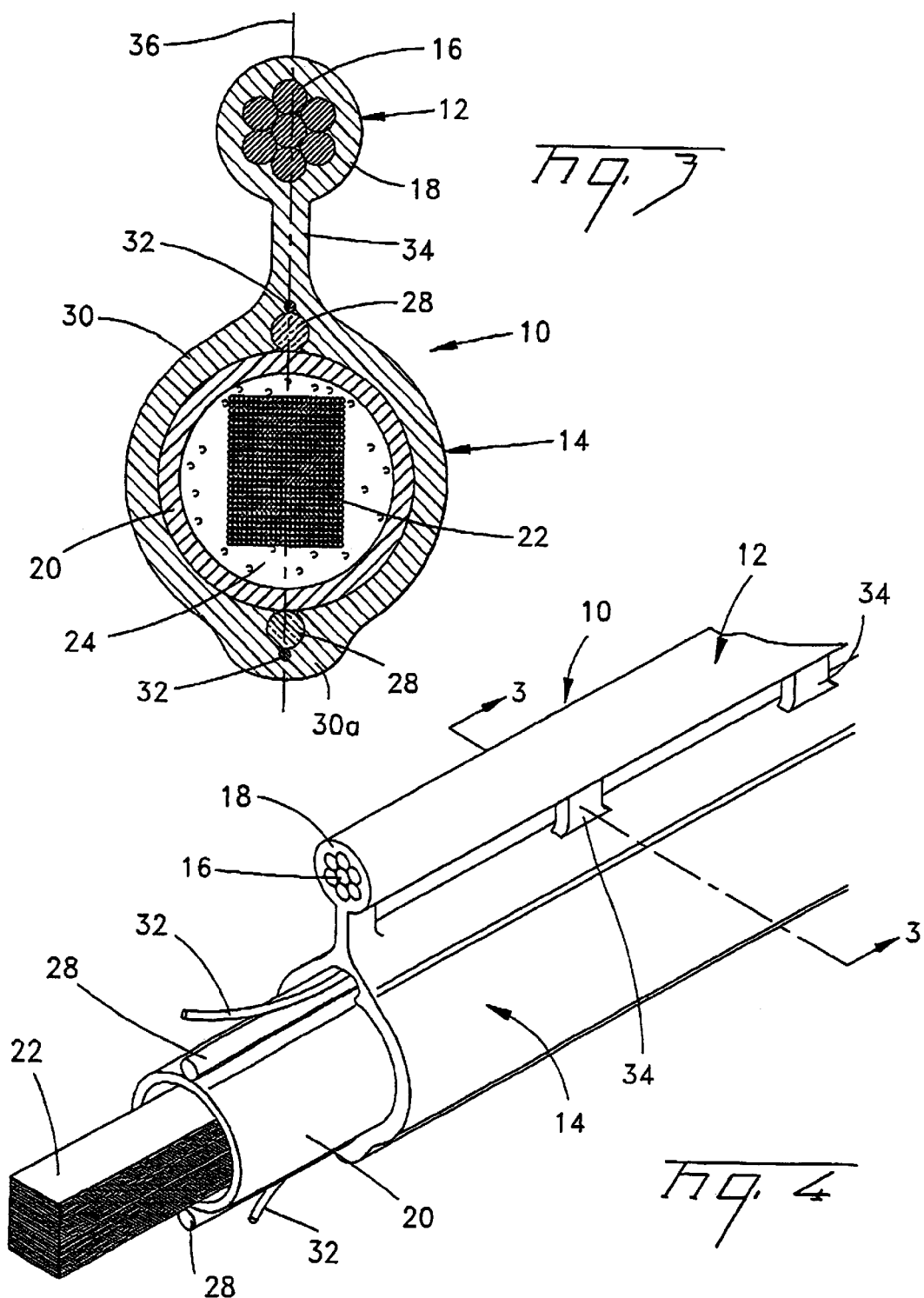

SELF-SUPPORTING FIBER OPTIC CABLE

FIELD OF THE INVENTION

The present invention relates generally to fiber optic cables and, more particularly, to self-supporting fiber optic cables.

BACKGROUND OF THE INVENTION

Fiber optic cables can be employed in a variety of applications including, for example, the transmission of voice, video and/or data transmission. Fiber optic cables can be installed, for example, in conduits that are disposed within the ground or aerially by being suspended between utility poles. Self-supporting fiber optic cables typically include a messenger section including optical fibers in a tube, and a carrier section including a support member, for example, a steel wire. Self-supporting fiber optic cables should be designed to withstand the relatively large tensile forces that can be experienced during the service life of the cable. In addition, self-supporting fiber optic cables must be capable of withstanding the additional tensile forces associated with thermal effects, wind, and/or ice loading. Self-supporting fiber optic cables should also be capable of withstanding significant vibration.

One type of self-supporting fiber optic cable has a general "figure 8" configuration, wherein the messenger section is connected to the carrier section by at least one web. When the cable is installed, the messenger section bears most of the tension, supporting the carrier section and protecting the optical fibers from the relatively high tensile forces acting on the messenger section. With increasing tension, however, the messenger wire tends to elongate which may cause the carrier section of the cable to elongate. In conventional self-supporting fiber optic cables in which the carrier section has the same length as the messenger section, the elongation of the messenger and carrier sections can place the optical fibers under tension and introduce an undesirable level of optical attenuation. In order to at least partially protect the optical fibers from unnecessarily high tensile forces and/or fiber strain, self-supporting fiber optic cables have been designed to have an overlength of the carrier section with respect to the messenger section. For example, the carrier section can include an overlength of about 0.2% relative to the messenger section. See, for example, U.S. Pat. Nos. 4,662,712 and 4,883,671, the contents of which are incorporated by reference in their respective entireties herein. Messenger section elongation of a self-supporting fiber optic cable that has an overlength can be taken up by the overlength of the carrier section, at least up until the point that the elongation of the messenger section exceeds the overlength of the carrier section. By appropriately designing the self-supporting fiber optic cables such that the overlength of the carrier section is at least as great as the anticipated maximum elongation of the messenger section, the optical fibers can be protected from the relatively high tensile forces acting on the messenger section, thereby controlling optical attenuation. Moreover, the overlength can be advantageous for mid-span access of the optical fibers.

Self-supporting fiber optic cables are conventionally designed such that the overlength of the carrier section can "sag" in almost any direction. For example, the self-supporting fiber optic cables described by U.S. Pat. Nos. 4,662,712 and 4,883,671 exhibit uncontrolled sagging between web-like supports relative to the messenger section. The possibility that the carrier section may be disposed in almost any direction relative to the messenger section can be disadvantageous with respect to the packaging and shipping of the fiber optic cable. Fiber optic cables are typically wound upon a reel for shipment prior to installation. Since the carrier section may not always be disposed in the same manner relative to the messenger section, and the spacing between the messenger and carrier sections may vary, the fiber optic cable cannot generally be wound onto the reel in a uniform fashion. Moreover, the strength members in the wound cable can be dislodged during the winding step because the radially outermost strength member could be under significant tension and can move toward the center of the cable and may partially or catastrophically crush the tube. Alternatively, significantly tensioned strength members may slip circumferentially about the tube.

SUMMARY OF THE INVENTION

The present invention can be practiced in the form of a fiber optic cable comprising: a messenger section comprising at least one support member; a jacket surrounding the at least one support member; a carrier section having an over-length with respect to the messenger section, the carrier section comprising a tube, at least one optical fiber disposed within the tube, at least one strength member proximate the tube; a jacket surrounding the tube and the at least one strength member, and a plurality of intermittent webs connecting the respective jackets of the messenger section and the carrier section.

The present invention can also be practiced in the form of a fiber optic cable comprising: a messenger section comprising at least one support member and a jacket surrounding the at least one support member; a carrier section comprising a tube having at least one optical fiber disposed within the tube; at least one strength member positioned proximate the tube; and a jacket surrounding the tube and the at least one strength member, a web connecting the respective jackets of the carrier section and the messenger section, the at least one strength member being generally positioned in a reference plane that also generally extends through the messenger section, the carrier section and the web thereby imparting a preferential bend characteristic to the fiber optic cable.

The present invention can be practiced in the form of a fiber optic cable comprising: a messenger section comprising at least one support member and a jacket surrounding the at least one support member; a carrier section having an over-length with respect to the messenger section, the carrier section comprising a tube with at least one optical fiber disposed within the tube; a jacket surrounding the tube and the at least one strength member; and a plurality of intermittent webs connecting the respective jackets of the messenger section and the carrier section; the at least one strength member and the messenger section imparting a preferential bend characteristic to the cable whereby the carrier section preferentially bends in a plane generally orthogonally disposed to a reference plane that generally extends through the messenger section, the carrier section and the web.

BRIEF DESCRIPTION OF THE DRAWINGS

FIG. 1 is a cross-sectional view of a fiber optic cable according to a first embodiment of the present invention taken along line 1—1 of FIG. 2.

FIG. 2 is an isometric view of the fiber optic cable of FIG. 1.

FIG. 3 is a cross-sectional view of a fiber optic cable according to another embodiment of the present invention taken along line 3—3 of FIG. 4.

FIG. 4. is an isometric view of the fiber optic cable of FIG. 3.

DETAILED DESCRIPTION OF THE INVENTION

The present invention will now be described with reference to the accompanying drawings in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIGS. 1 and 2, a fiber optic cable 10 according to the most preferred embodiment of the present invention will be described. Fiber optic cable 10 is a self-supporting fiber optic cable that is particularly advantageous for aerial applications. Fiber optic cable 10 comprises a messenger section 12 and a carrier section 14.

Messenger section 12 extends longitudinally and includes at least one and, more preferably, a plurality of support members 16. The support members can be metallic wires, such as steel wires, that are helically wound or otherwise twisted together. However, the support members can be formed of different materials, such as glass-reinforced plastic (GRP), aramid reinforced plastic (ARP), fiber glass strands, or a co-extruded reinforced jacketing material, for example, fiberglass reinforced polyethylene. The messenger section also includes a jacket 18, typically formed of polyethylene, that surrounds the support members. As shown in FIGS. 1 and 2, jacket 18 has a generally circular transverse cross-section; however, jacket 18 can have other shapes as well.

Carrier section 14 is connected to messenger section 12 as described below and also extends in a longitudinal direction. Carrier section 14 preferably comprises a mono-tube, for example, a single core tube 20 that is generally centrally disposed within carrier section 14. Core tube 20 is preferably formed of polypropylene, although it can be formed with other suitable materials known in the art. Carrier section 14 also includes at least one and, more preferably, a plurality of glass single mode, multi-mode, or multi-core optical fibers 22 disposed within core tube 20. As shown in FIGS. 1 and 2, for example, the plurality of optical fibers can comprise one or more optical fiber ribbons formed into a stack and twisted. Alternatively, the optical fibers can be bundled or loose. In order to inhibit the migration of water in core tube 20, carrier section 14 preferably includes a water blocking substance 24 disposed therewithin. For example, water blocking substance 24 can be swellable yarns and/or water swellable tapes comprising a superabsorbent polymer. In order to further inhibit the migration of water, the carrier section can include a water blocking tape 26 that surrounds core tube 20. For example, a water blocking tape 26 comprising a superabsorbent substance can be longitudinally wrapped about the core tube so as to define a longitudinally extending seam.

Carrier section 14 preferably includes at least one strength member 28 extending lengthwise adjacent to core tube 20. While carrier section 14 can have a single strength member 28, carrier section 14 preferably includes a plurality of strength members 28 that are not stranded about the tube 20. Most preferably, strength members 28 are generally disposed in opposing locations about core tube 20 and extend longitudinally along core tube 20. The strength members can be formed of various materials, for example, steel, GRP, or ARP. Carrier section 14 also includes a jacket 30 surrounding core tube 20 and strength members 28. Preferably, jacket 30 is formed of the same material as jacket 18. Carrier section 14 preferably comprises one or more ripcords 32 that extend lengthwise along respective strength members 28. By pulling ripcords 32 in both radially outward and longitudinal directions, the ripcords can sever or otherwise separate jacket 30 in order to expose core tube 20.

Fiber optic cable 10 also includes a web 34 connecting messenger section 12 and carrier section 14. Typically, web 34 is formed of the same material that forms jackets 18, 30. However, web 34 can be formed of a different material, such as polyethylene having a different molecular weight distribution or average than the polyethylene that forms jackets 18, 30. Preferably, web 34 comprises a plurality of intermittent webs as depicted, for example, in FIG. 2. Intermittent webs 34 connect messenger and carrier sections 12, 14 along the length thereof, but otherwise permit the messenger and carrier sections to be spaced apart from one another in the regions between the webs.

Jacket 30 preferably has a generally circular cross sectional shape (FIGS. 1 and 2). However, jacket 30 can have a noncircular shape (FIGS. 3 and 4) whereby the thickness of jacket 30 is minimized and includes an outwardly extending portion 30a proximate at least one of strength members 28. By forming jacket 30 as generally depicted in FIGS. 3 and 4, the overall thickness of the jacket can be minimized relative to the circular jacket depicted in FIGS. 1 and 2, thereby reducing the amount of jacketing material required for the carrier section and correspondingly reducing the material costs associated with the manufacture of fiber optic cable 10.

As shown in FIG. 4, messenger and carrier sections 12, 14 can have essentially equal lengths such that the messenger and carrier sections extend longitudinally in a parallel fashion without an overlength in the messenger section. More preferably, however, the carrier section has an overlength relative to the messenger section (FIGS. 1 and 2). While the carrier section can have different amounts of overlength relative to the messenger section, carrier section 14 preferably has an overlength of at least about 0.2% with respect to the messenger section. Where the carrier section has an overlength with respect to the messenger section, optical fibers in the carrier section are substantially protected from the relatively high tensile forces acting on the messenger section. Thus, optical fibers 22 disposed within core tube 20 are to a certain extent isolated from the tensile forces to which the fiber optic cable is subjected, thereby avoiding an undesirable level of optical attenuation. As will be apparent, if the messenger section elongates by more than the amount of the overlength, the carrier section and, in turn, the optical fiber will also begin to elongate. As such, the overlength of the carrier section is preferably selected such that the overlength is at least as great as the desired maximum elongation of the messenger section.

Strength members 28 are preferably generally positioned in a reference plane 36 (FIGS. 1 and 3) that generally extends through messenger section 12, carrier section 14, and web 34. More particularly, reference plane 36 extends through the longitudinal axes of both the messenger section and the carrier section. At least one strength member 28 can be disposed between core tube 20 and messenger section 12 in general alignment with web 34. A strength member 28 can be disposed on the generally opposed side of core tube 20.

Fiber optic cables according to the present invention preferably have a preferential bend characteristic. As described above, reference plane 36 generally extends through messenger section 12, carrier section 14 and web 34 and, more preferably, extends through the longitudinal axes defined by the messenger and carrier sections. The preferential bend of the carrier section is primarily created by positioning at least one strength member 28 relative to core tube 20. In this regard, carrier section 20 preferentially bends generally orthogonally to a plane that extends through the general center of the core tube, the at least one strength member 28, and the general center of messenger section 12. In the most preferred embodiment, at least two strength members 28 are disposed in reference plane 36 so that carrier section 14 will preferentially bend generally orthogonally to reference plane 36.

In addition to defining the preferential bend of carrier section 14, positioning strength members 28 in reference plane 36 serves to uniformly wrap fiber optic cable 10 about a reel. In this regard, "figure 8" type cables are typically wound onto a reel such that the messenger and carrier sections lie side-by-side. The neutral axes of strength elements 28 are generally aligned with the reference plane when bent generally orthogonally thereto. Strength members that are positioned in the reference plane will advantageously be under substantially equal tension when bent. By positioning the strength members in reference plane 36 fiber optic cables 10 can avoid the partial crushing of the core tube and the slipping or other displacement of a strength member.

Fiber optic cables 10 can be fabricated in a manner similar to that described by U.S. patent application Ser. No. 09/102, 392 filed Jun. 22, 1998, the contents of which are incorporated herein by reference. In order to form carrier section 14 core tube 20, including optical fibers 22 and water blocking substance 24, can be drawn from a pay-off. A water blocking tape 26 is then longitudinally wrapped about core tube 20. Concurrently, at least one, and more preferably, two strength members 28 and rip cords 32 are drawn from respective pay-offs and disposed along generally opposed sides of the core tube. While the carrier section is being formed, support members 16 are drawn from a respective pay-off and stranded together in preparation of the messenger section 12. The internal components of messenger section 12 and carrier section 14 are then passed through an extrusion cross head that extrudes jackets 18,30. Jackets 18,30 surround support members 16, core tube 20 and strength members 28. In addition, the extrusion cross head forms webs 34 preferably with a number of windows. For example, the windows between the webs can be formed by a reciprocating plunger in the extruder.

In order to form a carrier section 14 having an overlength relative to messenger section 12, the messenger section is preferably placed under more tension than the carrier section during the manufacturing process. As described in detail by U.S. patent application No. 09/102,392, incorporated herein by reference hereinabove, the cable manufacturing line typically includes a cable tensioner comprised of a pair of multi-wrap capstans for engaging the cable and, in particular, the messenger section downstream of the extruder. The cable manufacturing line also typically includes a carrier tensioning apparatus and a messenger tensioning apparatus comprised of a single wrap capstan and a multi-wrap capstan, respectively, for engaging cable core 20 and support elements 16, respectively, upstream of the extruder. By controlling the tensioning apparatuses such that the messenger tensioner runs at a slightly slower speed, such as about 0.2% slower than the carrier tensioner, the messenger section is elongated relative to the carrier section prior to entering the extruder. After passing through the cable tensioner, downstream of the extruder, the tension in the cable is released and the fiber optic cable is wrapped about a take-up reel.

Upon releasing tension from messenger section 12 and carrier section 14, the messenger section will contract to a relaxed state. As such, the carrier section will be longer than the messenger section as a result of the increased tension that had been exerted upon the messenger section during fabrication. As described by U.S. patent application No. 09/102, 392, the cable manufacturing line that fabricates the fiber optic cable of the present invention can also include a number of other components, such as dancers, turning sheathes, length counters, cable dryers and diameter gauges in order to form a fiber optic cable of the desired dimensions.

Fiber optic cable 10 of the present invention can be formed in a variety of sizes. In one embodiment in which the messenger and carrier sections 12, 14 both have a circular shape as shown in FIGS. 1 and 2, the messenger and carrier sections can have outer diameters of nominally about 7.2 mm and 9.2 mm, respectively. In this embodiment, support members 16 have a cumulative diameter of nominally about 4.2 mm such that jacket 18 of the messenger section has a thickness of nominally about 3 mm. In addition, core tube 20 of the carrier section of this embodiment has a thickness of nominally about 1.6 mm with an interior diameter of nominally about 5.4 mm and an outer diameter of nominally about 7.0 mm. As such, jacket 30 of the carrier section has a thickness of nominally about 2.2 mm. In addition, intermittent webs 34 of the fiber optic cable of this embodiment have a lateral width of about 1.0 to about 3.0 mm, preferably about 1.6 mm, and a height between the messenger and carrier sections of about 2.0 to about 4.0 mm. The intermittent webs of this embodiment also have a longitudinal length of nominally about 5.5 cm, with a spacing of nominally about 57 cm between adjacent webs. As such, the fiber optic cable of this particular embodiment is self-supporting for spans of up to, for example, 200 feet under heavy loading conditions as defined by the National Electric Safety Code (NESC). As will be apparent, fiber optic cables of the present invention can be designed in different manners with components having different thicknesses and sizes in order to be self-supporting for different spans without departing from the spirit and scope of the present invention.

Therefore, fiber optic cables 10 of the present invention protect the optical fibers 22 from stress and fiber breakage, and control corresponding attenuation losses as a result of the overlength of carrier section 14. In addition, the overlength of the carrier section of this embodiment facilitates mid-span access of the optical fibers since the overlength can provide at least some slack for working with the optical fibers at a mid-span location even though the fiber optic cable is preferably of a monotube construction and the optical fibers are not helically stranded about a central strength member. Since strength members 28 are preferably disposed in reference plane 36 the carrier section of the fiber optic cable of one embodiment preferentially bends in a plane that is generally orthogonal to the reference plane. Thus, the carrier section can bend in a predictable manner in order to accommodate the overlength, thereby facilitating a uniform winding of the fiber optic cable about a reel for shipping and storage purposes. In addition, by generally positioning the strength members in the reference plane, the strength members are under substantially equal tension once the cable has been wound onto a reel such that the strength members will not tend to crush core tube 20 or move about the core tube.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a descriptive sense only and not for purposes of limitation. For example, the overlength can be greater or less than about 0.02%, e.g., 0.015% to about 0.05%. The cable can include multiple layers of jacketing material. At least two strength elements 28 can be placed side by side, for example, so that the cable comprises at least four strength elements 28.

Accordingly, what is claimed is:

1. A fiber optic cable comprising:
    a messenger section comprising at least one support member;
    a jacket surrounding said at least one support member;
    a carrier section having an over-length with respect to said messenger section, said carrier section comprising a mono-tube, at least one optical fiber disposed within said tube, at least one strength member proximate said tube; a jacket surrounding said tube and said at least one strength member, and a plurality of intermittent webs connecting said respective jackets of said messenger section and said carrier section; said at least one strength member being generally positioned in a plane extending through said messenger section, said carrier section and said plurality of intermittent webs thereby imparting a preferential bend characteristic to said fiber optic cable.

2. A fiber optic cable according to claim 1, said at least one strength member comprising a pair of strength members disposed on generally opposite sides of said tube.

3. A fiber optic cable according to claim 1, said at least one strength member being disposed between said tube and said messenger section in alignment with said plurality of intermittent webs.

4. A fiber optic cable according to claim 1, said carrier section comprising an over-length of at least 0.2% with respect to said messenger section.

5. A fiber optic cable according to claim 1, said jacket of said carrier section comprising a noncircular Shape.

6. A fiber optic cable according to claim 5, said jacket comprising an outwardly extending portion proximate said at least one strength member.

7. A fiber optic cable according to claim 1, said carrier section further comprising a water blocking substance disposed within said tube.

8. A fiber optic cable comprising:
    a messenger section comprising at least one support member and a jacket surrounding said at least one support member;
    a carrier section comprising a tube having at least one optical fiber disposed within said tube;
    at least one strength member positioned proximate a water-blocking tape that substantially surrounds said tube; and a jacket surrounding said tube, said water-blocking tape, and said at least one strength member, a web connecting said jackets of said carrier section and said messenger section, said at least one strength member being generally positioned in a plane that also generally extends through said messenger section, said carrier section and said web thereby imparting a preferential bend characteristic to said fiber optic cable.

9. A fiber optic cable according to claim 8, said carrier section having an over-length with respect to said messenger section.

10. A fiber optic cable according to claim 8, said web comprising a plurality of intermittent webs.

11. A fiber optic cable according to claim 8, said messenger section and said carrier section defining respective longitudinal axes, and said at least one strength member is generally positioned in a reference plane extending through the longitudinal axes of both said messenger section and said carrier section.

12. A fiber optic cable according to claim 8, comprising another strength member, said strength members being generally disposed on opposite sides of said tube.

13. A fiber optic cable according to claim 8, said at least one strength member is generally disposed between said tube and said messenger section in alignment with said web.

14. A fiber optic cable comprising:
    a messenger section comprising at least one support member and a jacket surrounding said at least one support member;
    a carrier section having an over-length with respect to said messenger section, said carrier section comprising a tube with at least one optical fiber disposed within said tube;
    a jacket surrounding said tube and said at least one strength member; and
    a plurality of intermittent webs connecting said respective jackets of said messenger section and said carrier section;
    said at least one strength member and said messenger section imparting a preferential bend characteristic to said cable whereby said carrier section preferentially bends in a plane generally orthogonally disposed to a reference plane that generally extends through said messenger section, said carrier section and said web.

15. A fiber optic cable according to claim 14 further comprising another strength member positioned in the reference plane.

16. A fiber optic cable according to claim 14, said at least one strength member being disposed between said tube and said messenger section in alignment with said web.

17. A fiber optic cable according to claim 15, at least one of said strength members being disposed proximate said tube and generally opposite said web.

18. A fiber optic cable according to claim 14, said carrier section comprising a longitudinal axis, the plane in which said carrier section preferentially bends also generally extends through the longitudinal axis of said carrier section.

* * * * *